United States Patent
Womac

[19]

[11] Patent Number: 5,913,673
[45] Date of Patent: Jun. 22, 1999

[54] FISHING POLE SUPPORTING DEVICE

[76] Inventor: Samuel M. Womac, P.O. Box 555, Charleston, Tenn. 37310

[21] Appl. No.: 09/041,251

[22] Filed: Mar. 12, 1998

[51] Int. Cl.⁶ .................................................. A01K 97/10
[52] U.S. Cl. ............................................. 43/54.1; 43/21.2
[58] Field of Search .................................. 43/21.2, 54.1, 43/55; 211/70.8; 248/512, 513, 519, 520; 224/922; D22/147, 148; 206/315.11

[56] References Cited

U.S. PATENT DOCUMENTS

| D. 324,951 | 3/1992 | Narramore | D6/552 |
|---|---|---|---|
| 440,727 | 11/1890 | Sheape | 248/520 |
| 1,318,007 | 10/1919 | Gau | 43/21.2 |
| 2,287,641 | 6/1942 | Russell | 43/21.2 |
| 2,555,073 | 5/1951 | Zdankoski | 43/21.2 |
| 2,596,403 | 5/1952 | Hoffman | 43/21.2 |
| 2,774,563 | 12/1956 | Pribis | 248/520 |
| 3,546,805 | 12/1970 | Schaeffer | 43/21.2 |
| 3,701,504 | 10/1972 | Woods et al. | 248/513 |
| 4,156,982 | 6/1979 | Phillips, Jr. | 43/21.2 |
| 4,479,322 | 10/1984 | Koppel | 43/21.2 |
| 4,523,403 | 6/1985 | Ivy et al. | 43/21.2 |
| 4,594,804 | 6/1986 | McClelland | 43/21.2 |
| 4,696,122 | 9/1987 | Van Der Zyl | 43/21.2 |
| 4,815,593 | 3/1989 | Brown | 206/315.11 |
| 4,827,659 | 5/1989 | Gulley et al. | 206/315.11 |
| 4,841,660 | 6/1989 | James | 43/21.2 |
| 4,848,021 | 7/1989 | Simko | 43/21.2 |
| 4,953,318 | 9/1990 | Vasseur, Jr. | 43/21.2 |
| 5,025,584 | 6/1991 | Butterwick, Sr. | 43/21.2 |
| 5,050,335 | 9/1991 | Hisey | 43/55 |
| 5,058,302 | 10/1991 | Minneman | 206/315.11 |
| 5,152,494 | 10/1992 | Frunzar | 43/21.2 |
| 5,305,544 | 4/1994 | Testa, Jr. | 43/54.1 |
| 5,402,596 | 4/1995 | Gillming, Jr. | 43/54.1 |
| 5,414,953 | 5/1995 | Taylor | 43/54.1 |
| 5,487,475 | 1/1996 | Knee | 211/70.8 |
| 5,505,354 | 4/1996 | Hutton et al. | 206/315.11 |
| 5,632,427 | 5/1997 | Gattuso et al. | 43/21.2 |
| 5,640,944 | 6/1997 | Minneman | 206/315.11 |
| 5,657,883 | 8/1997 | Badia | 211/70.8 |
| 5,678,700 | 10/1997 | Crosson, Jr. | 211/70.8 |

Primary Examiner—Michael J. Carone
Assistant Examiner—Darren W. Ark

[57] ABSTRACT

A fishing pole supporting device for holding fishing rods and other items when fishing. The device includes a base with a first end wall coupled to the first end of the base and a second end wall coupled to the second end of the base. The upper end of the first end wall has a plurality of spaced apart fingers upwardly extending therefrom. Each adjacent pair of fingers define a slot adapted for receiving a portion of a fishing rod therein. The second end wall has a pair of spaced apart apertures extending therethrough. The apertures are located adjacent the upper end of the second end wall and are each adapted for inserting a portion of a fishing rod therein.

15 Claims, 2 Drawing Sheets

FISHING POLE SUPPORTING DEVICE

BACKGROUND OF THE INVENTION

1. Field of the Invention

The present invention relates to fishing accessories and more particularly pertains to a new fishing pole supporting device for holding fishing rods and other items when fishing.

2. Description of the Prior Art

The use of fishing accessories is known in the prior art. More specifically, fishing accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing accessories include U.S. Pat. No. 4,953,318; U.S. Pat. No. 4,523,403; U.S. Pat. No. 3,546,805; U.S. Pat. No. 4,841,660; U.S. Pat. No. Des. 324,951; and U.S. Pat. No. 2,287,641.

While these devices fulfill their respective, particular objectives and requirements, the aforementioned patents do not disclose a new fishing pole supporting device. The inventive device includes a base with a first end wall coupled to the first end of the base and a second end wall coupled to the second end of the base. The upper end of the first end wall has a plurality of spaced apart fingers upwardly extending therefrom. Each adjacent pair of fingers define a slot adapted for receiving a portion of a fishing rod therein. The second end wall has a pair of spaced apart apertures extending therethrough. The apertures are located adjacent the upper end of the second end wall and are each adapted for inserting a portion of a fishing rod therein.

In these respects, the fishing pole supporting device according to the present invention substantially departs from the conventional concepts and designs of the prior art, and in so doing provides an apparatus primarily developed for the purpose of holding fishing rods and other items when fishing.

SUMMARY OF THE INVENTION

In view of the foregoing disadvantages inherent in the known types of fishing accessories now present in the prior art, the present invention provides a new fishing pole supporting device construction wherein the same can be utilized for holding fishing rods and other items when fishing.

The general purpose of the present invention, which will be described subsequently in greater detail, is to provide a new fishing pole supporting device apparatus and method which has many of the advantages of the fishing accessories mentioned heretofore and many novel features that result in a new fishing pole supporting device which is not anticipated, rendered obvious, suggested, or even implied by any of the prior art fishing accessories, either alone or in any combination thereof.

To attain this, the present invention generally comprises a base with a first end wall coupled to the first end of the base and a second end wall coupled to the second end of the base. The upper end of the first end wall has a plurality of spaced apart fingers upwardly extending therefrom. Each adjacent pair of fingers define a slot adapted for receiving a portion of a fishing rod therein. The second end wall has a pair of spaced apart apertures extending therethrough. The apertures are located adjacent the upper end of the second end wall and are each adapted for inserting a portion of a fishing rod therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing pole supporting device apparatus and method which has many of the advantages of the fishing accessories mentioned heretofore and many novel features that result in a new fishing pole supporting device which is not anticipated, rendered obvious, suggested, or even implied by any of the prior art fishing accessories, either alone or in any combination thereof.

It is another object of the present invention to provide a new fishing pole supporting device which may be easily and efficiently manufactured and marketed.

It is a further object of the present invention to provide a new fishing pole supporting device which is of a durable and reliable construction.

An even further object of the present invention is to provide a new fishing pole supporting device which is susceptible of a low cost of manufacture with regard to both materials and labor, and which accordingly is then susceptible of low prices of sale to the consuming public, thereby making such fishing pole supporting device economically available to the buying public.

Still yet another object of the present invention is to provide a new fishing pole supporting device which provides in the apparatuses and methods of the prior art some of the advantages thereof, while simultaneously overcoming some of the disadvantages normally associated therewith.

Still another object of the present invention is to provide a new fishing pole supporting device for holding fishing rods and other items when fishing.

Yet another object of the present invention is to provide a new fishing pole supporting device which includes a base with a first end wall coupled to the first end of the base and a second end wall coupled to the second end of the base. The upper end of the first end wall has a plurality of spaced apart fingers upwardly extending therefrom. Each adjacent pair of fingers define a slot adapted for receiving a portion of a fishing rod therein. The second end wall has a pair of spaced apart apertures extending therethrough. The apertures are located adjacent the upper end of the second end wall and are each adapted for inserting a portion of a fishing rod therein.

Still yet another object of the present invention is to provide a new fishing pole supporting device that helps keep a user's fishing pole off of the ground to help it from becoming dirty.

Even still another object of the present invention is to provide a new fishing pole supporting device that prevents a fishing pole from being pulled into a body of water when a fish pulls on the fishing line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
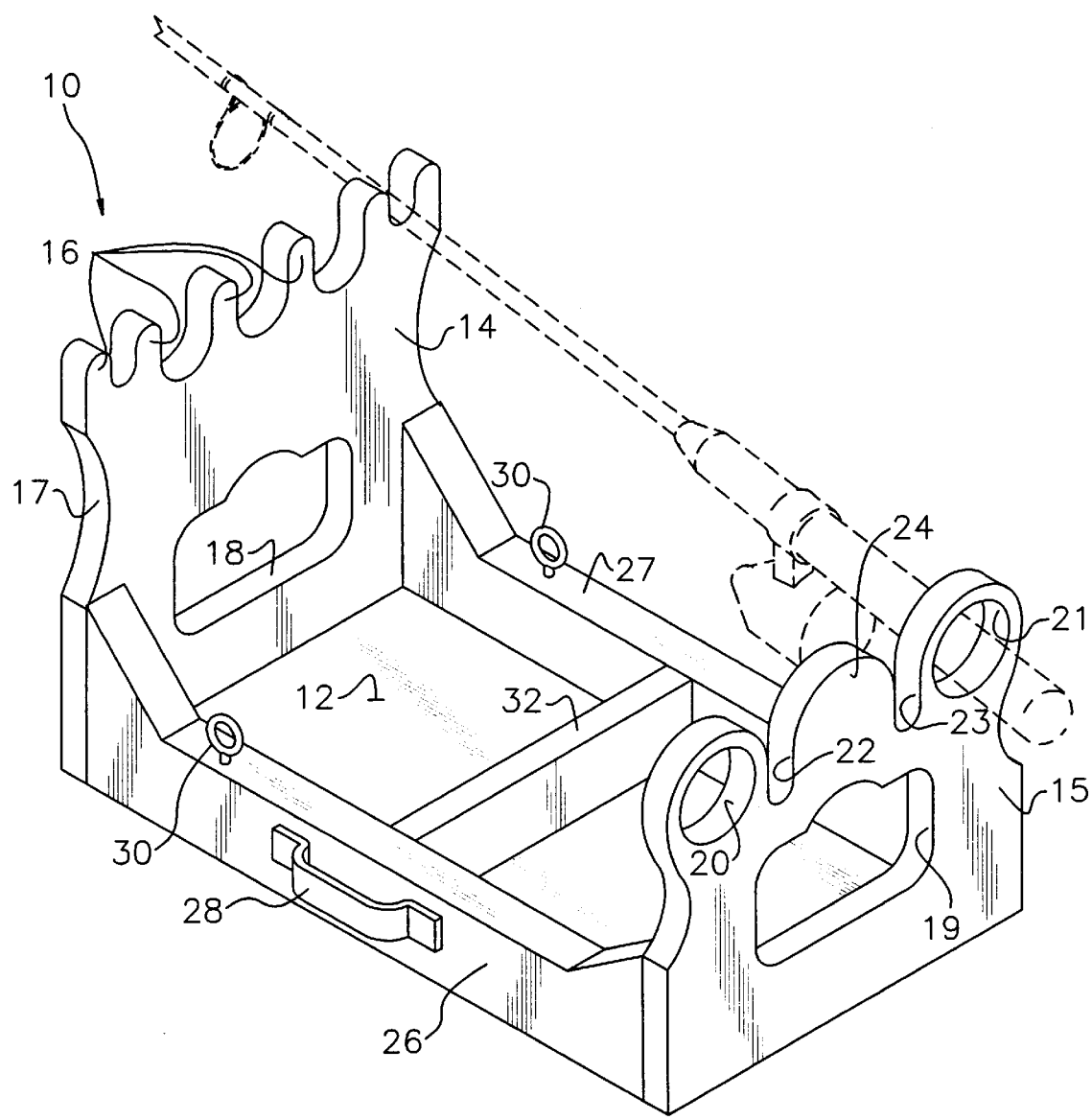
FIG. 1 is a schematic perspective view of a new fishing pole supporting device in use supporting a fishing rod thereon according to the present invention.
Figure 2:
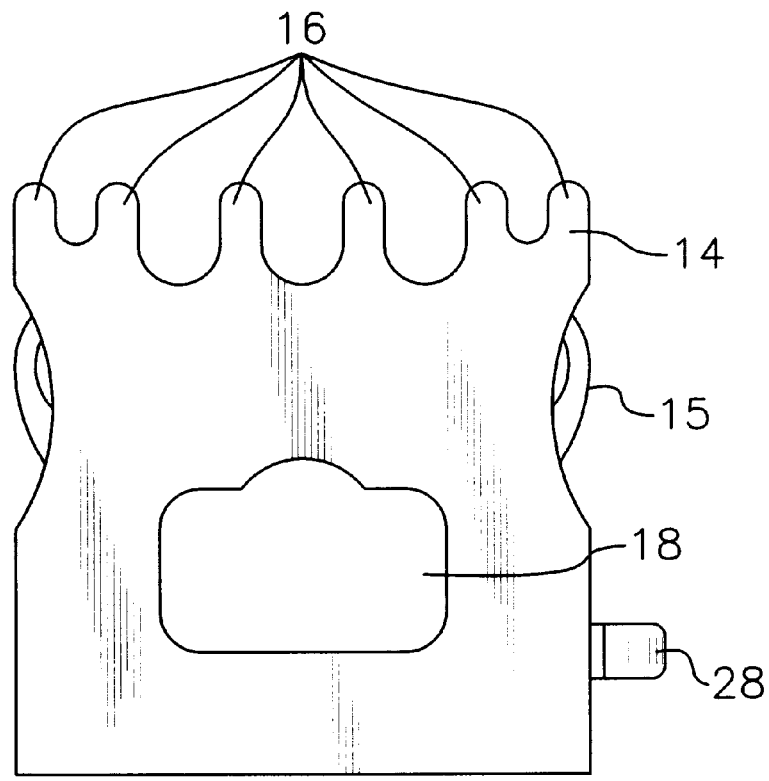
FIG. 2 is a schematic side view of the first end wall of the present invention.
Figure 3:
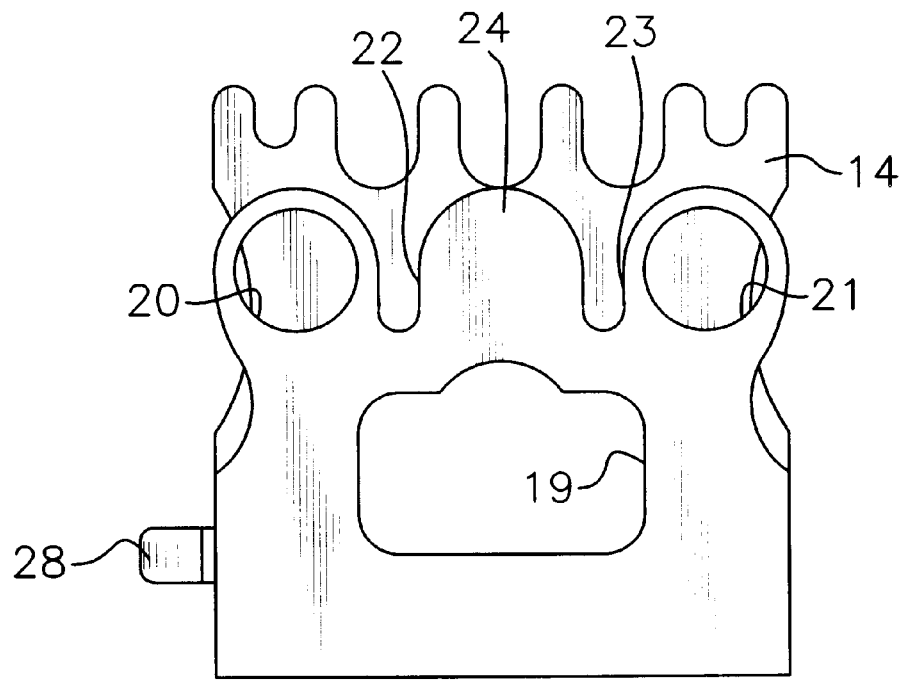
FIG. 3 is a schematic side view of the second end wall of the present invention.

With reference now to the drawings, and in particular to FIGS. 1 through 3 thereof, a new fishing pole supporting device embodying the principles and concepts of the present invention and generally designated by the reference numeral 10 will be described.

As best illustrated in FIGS. 1 through 3, the fishing pole supporting device 10 generally comprises a base 12 with a first end wall 14 coupled to the first end of the base 12 and a second end wall 15 coupled to the second end of the base 12. The upper end of the first end wall 14 has a plurality of spaced apart fingers 16 upwardly extending therefrom. Each adjacent pair of fingers 16 define a slot adapted for receiving a portion of a fishing rod therein. The second end wall 15 has a pair of spaced apart apertures 20,21 extending therethrough. The apertures 20,21 are located adjacent the upper end of the second end wall 15 and are each adapted for inserting a portion of a fishing rod therein.

In closer detail, the base 12 is generally rectangular and has substantially planar upper and lower surfaces, first and second ends, and a pair of sides extending between the first and second ends of the base 12. The first end wall 14 is coupled to the first end of the base 12 and is upwardly extended from the upper surface of the base 12 while the second end wall 15 is coupled to the second end of the base 12 and is upwardly extended from the upper surface of the base 12. Preferably, the first and second end walls 14,15 are extended substantially perpendicular to the upper surface the base 12.

The first end wall 14 has an upper end and a pair of sides extending between the upper end of the first end wall 14 and the base 12. The upper end of the first end wall 14 has a plurality of spaced apart fingers 16 upwardly extending therefrom. Each adjacent pair of fingers 16 define a slot. Each slot is adapted for receiving a portion of a fishing rod therein. Preferably, the slots of the first end wall 14 are generally U-shaped. Ideally, the plurality of fingers 16 of the first end wall 14 comprise six fingers 16 such that five slots are formed between the fingers 16. In the preferred embodiment, each of the sides of the first end wall 14 also has an arcuate portion 17.

Like the first end wall, the second end wall 15 has an upper end and a pair of sides extending from the upper end of the second end wall 15 and the base 12. The second end wall 15 also has a pair of spaced apart apertures 20,21 extending therethrough. The apertures 20,21 are located adjacent the upper end of the second end wall 15 with one of the apertures 20 positioned adjacent one of the sides of the second end wall 15 and the other aperture 21 positioned adjacent the other side of the second end wall 15. The apertures 20,21 are adapted for inserting a handle portion of a fishing rod therein as shown in FIG. 1. The upper end of the second end wall 15 also preferably has a pair of spaced apart slots 22,23 extended from the upper end of the second end wall 15 towards the base 12. The slots 22,23 of the second end wall 15 are positioned between the apertures 20,21 of the second end wall 15 and define a center tab 24 therebetween.

Preferably, the first and second end walls 14,15 each have a cutout 18,19 therethrough. The cutouts 18,19 are designed for providing additional lifting handles for the device.

The device 10 also includes a pair of elongate side walls 26,27 coupled to the base 12. The side walls 26,27 are upwardly extended from the upper surface of the base 12 with one of the side walls 26 positioned adjacent one of the sides of the base 12 and the other side wall 27 positioned adjacent the other side of the base 12. The lengths of the side walls 26,27 are extended between the first and second end walls 14,15. Preferably one of the side walls 26 has a handle 28 is coupled thereto. The handle 28 is outwardly extended away from the associated side of the base 12 and is designed for permitting easy carrying of the device 10 like a suitcase. Preferably, each of the side walls 26,27 has loop 30 upwardly extending therefrom. The loops 30 are adapted for securing items such as stringers and a minnow bucket therefrom. An elongate cross member 32 is extended between the side walls 26,27 and is positioned adjacent the upper surface of the base 12. The cross member 32 is located between the first and second end walls 14,15 and divide the upper surface of the base 12 into a pair of compartments for holding items therein.

The first end wall 14 has a height defined between the upper end of the first end wall 14 and the base 12, while the second end wall 15 has a height defined between the upper end of the second end wall 15 and the base 12. Preferably, the height of the first end wall 14 is greater than the height of the second end wall 15. Ideally, the height of the first end wall 14 is less than about 18 inches while the height of the second end wall 15 is less than about 15 inches. The base 12 has a length defined between the first and second ends of the base 12. Ideally, the length of the base 12 is less than about 22 inches. The base 12 also has a width defined between the sides of the base 12. Ideally, the width of the base 12 is less than about 16 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for holding a fishing rod, comprising:
   a base having upper and lower surfaces, first and second ends, and a pair of side walls extending between said first and second ends of said base;
   first and second end walls;
   said first end wall being coupled to said first end of said base and being extended from said upper surface of said base;
   said second end wall being coupled to said second end of said base and being upwardly extended from said upper surface of said base;
   said first end wall having an upper end and a pair of sides extending between said upper end of said first end wall and said base;
   said upper end of said first end wall having a plurality of spaced apart fingers upwardly extending therefrom, each adjacent pair of fingers defining a slot being adapted for receiving a portion of a fishing rod therein;
   said second end wall having an upper end and a pair of sides extending between said upper end of said second end wall and said base;
   said second end wall having a pair of spaced apart apertures extending therethrough, said apertures being located adjacent said upper end of said second end wall, said apertures of said second end being adapted for inserting a portion of a fishing rod therein;
   said first and second end walls each having a cutout therethrough, said cutouts being for providing main lifting handles; and
   one of said side walls having a handle coupled thereto, said handle being outwardly extended away from the associated side wall of said base, said handle being for aiding positioning of said base when said lower surface of said base is positioned horizontally, said handle further providing an auxiliary lifting handle.

2. The device of claim 1, wherein said base is generally rectangular.

3. The device of claim 1, wherein said first and second end walls are extended substantially perpendicular to said upper surface said base.

4. The device of claim 1, wherein said slots of said first end wall are generally U-shaped.

5. The device of claim 4, wherein said plurality of fingers of said first end wall comprise six fingers.

6. The device of claim 1, wherein each of said sides of said first end wall has an arcuate portion.

7. The device of claim 1, wherein one of said apertures of said second end wall is positioned adjacent one of said sides of said second end wall, the other of said apertures of said second end wall is positioned adjacent the other of said sides of said second end wall.

8. The device of claim 7, wherein said upper end of said second end wall has a pair of spaced apart slots being extended from said upper end of said second end wall towards said base, said slots of said second end wall being positioned between said apertures of said second end wall, said slots of said second end wall defining a tab therebetween.

9. The device of claim 1, wherein said side walls being upwardly extended from said upper surface of said base, one of said side walls being positioned adjacent one of said sides of said base, the other of said side walls being positioned adjacent the other of said sides of said base, each of said side walls having a length, the lengths of said side walls being extended between said first and second end walls.

10. The device of claim 9, wherein each of said side walls has a loop upwardly extending therefrom.

11. The device of claim 9, wherein an elongate cross member is extended between said side walls and is positioned adjacent said upper surface of said base, said cross member being located between said first and second end walls.

12. The device of claim 1, wherein said first end wall has a height defined between said upper end of said first end wall and said base, wherein said second end wall has a height defined between said upper end of said second end wall and said base, wherein said height of said first end wall is greater than said height of said second end wall.

13. The device of claim 12, wherein said height of said first end wall is less than about 18 inches, and wherein said height of said second end wall is less than about 15 inches.

14. The device of claim 1, wherein said base has a length defined between said first and second ends of said base, wherein said length of said base is less than about 22 inches, wherein said base has a width being defined between said sides of said base, wherein said width of said base is less than about 16 inches.

15. A device for holding a fishing rod, comprising:
   a base being generally rectangular and having upper and lower surfaces, first and second ends, and a pair of sides extending between said first and second ends of said base;
   first and second end walls;
   said first end wall being coupled to said first end of said base and being extended from said upper surface of said base, said first end wall being extended substantially perpendicular to said upper surface of said base;
   said second end wall being coupled to said second end of said base and being upwardly extended from said upper surface of said base, said second end wall being extended substantially perpendicular to said base;
   said first end wall having an upper end and a pair of sides extending between said upper end of said first end wall and said base;
   said upper end of said first end wall having a plurality of spaced apart fingers upwardly extending therefrom, each adjacent pair of fingers defining a slot being adapted for receiving a portion of a fishing rod therein, wherein said slots of said first end wall are generally U-shaped, wherein said plurality of fingers of said first end wall comprise six fingers;

each of said sides of said first end wall having an arcuate portion;

said first and second end walls each having a cutout therethrough;

said second end wall having an upper end and a pair of sides extending between said upper end of said second end wall and said base;

said second end wall having a pair of spaced apart apertures extending therethrough, said apertures being located adjacent said upper end of said second end wall, one of said apertures of said second end wall being positioned adjacent one of said sides of said second end wall, the other of said apertures of said second end wall being positioned adjacent the other of said sides of said second end wall, said apertures of said second end wall being adapted for inserting a portion of a fishing rod therein;

said upper end of said second end wall having a pair of spaced apart slots being extended from said upper end of said second end wall towards said base, said slots of said second end wall being positioned between said apertures of said second end wall, said slots of said second end wall defining a tab therebetween;

a pair of elongate side walls being coupled to said base, said side walls being upwardly extended from said upper surface of said base, one of said side walls being positioned adjacent one of said sides of said base, the other of said side walls being positioned adjacent the other of said sides of said base, each of said side walls having a length, the lengths of said side walls being extended between said first and second end walls;

one of said side walls having a handle being coupled thereto, said handle being outwardly extended away from the associated side of said base;

each of said side walls having a loop upwardly extending therefrom;

an elongate cross member being extended between said side walls and being positioned adjacent said upper surface of said base, said cross member being located between said first and second end walls;

wherein said first end wall has a height defined between said upper end of said first end wall and said base, wherein said second end wall has a height defined between said upper end of said second end wall and said base, wherein said height of said first end wall is greater than said height of said second end wall, wherein said height of said first end wall is less than about 18 inches, wherein said height of said second end wall is less than about 15 inches; and wherein said base has a length defined between said first and second ends of said base, wherein said length of said base is less than about 22 inches, wherein said base has a width being defined between said sides of said base, wherein said width of said base is less than about 16 inches.

\* \* \* \* \*